March 24, 1942.　　　V. TAVERNESE　　　2,277,568
COMBINED HEATER AND VACUUM CLEANER FOR MOTOR VEHICLES
Filed March 2, 1940　　　2 Sheets-Sheet 1

Inventor

V. Tavernese.

By Thos. H. Johnson

Attorney

March 24, 1942. V. TAVERNESE 2,277,568
COMBINED HEATER AND VACUUM CLEANER FOR MOTOR VEHICLES
Filed March 2, 1940 2 Sheets-Sheet 2
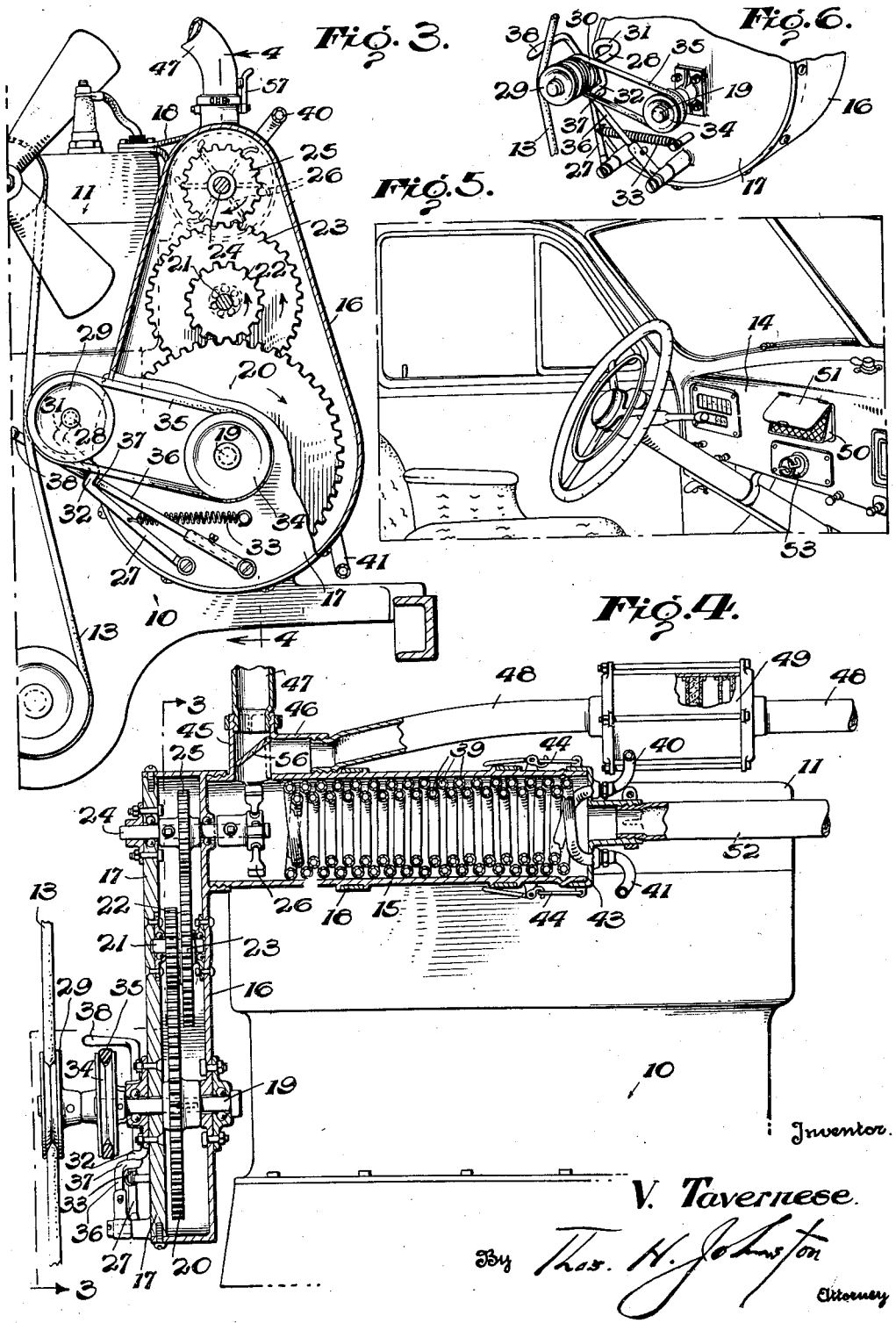
Inventor.
V. Tavernese.
By Thos. H. Johnston
Attorney Patented Mar. 24, 1942

2,277,568

UNITED STATES PATENT OFFICE 2,277,568

COMBINED HEATER AND VACUUM CLEANER FOR MOTOR VEHICLES

Vincent Tavernese, Washington, D. C.

Application March 2, 1940, Serial No. 321,938

4 Claims. (Cl. 237—1)

This invention relates to an improved vacuum cleaner and heater for motor vehicles.

As is well known, certain automobile heaters, as now on the market, embody a fan for circulating a current of air through a heating core of one kind or another and thus warming the car in which installed. Such heaters serve but a single purpose, obviously, and are not only idle during the summer months but, in winter, may be used only for the specific purpose of heating.

It is therefore an object of the present invention to provide a device which, throughout the year, may be employed as a vacuum cleaner for the car in which installed and, in winter, will provide an efficient heater.

A further object of the invention is to provide a device which, in summer, may be employed to circulate currents of fresh, unheated air within the car and thus tend toward cool driving comfort.

Still another object of the invention is to provide a device which will not be dependent upon the battery of the car or the intake suction of the engine but which will be driven by the fan belt of the engine and therefore positive in its operation.

Another object of the invention is to provide a device which may be conveniently rendered either operative or inoperative, and wherein air forced into the body of the car will be strained while also, incidental noise will be minimized.

And the invention seeks, as a still further object, to provide a device which, readily, may be either built into the original construction of a car or attached as a later accessory.

Other and incidental objects of the invention will appear during the course of the following description, and in the drawings:

Figure 3 is a transverse vertical sectional view on the line 3—3 of Figure 4.

Figure 4 is a vertical longitudinal section on the line 4—4 of Figure 3 and particularly showing the heating coil and the suction fan employed.

Figure 5 is a fragmentary perspective view showing the instrument board of the car, the heater outlet and the vacuum terminal connection, Figure 6 is a fragmentary perspective view particularly showing the power take-off.

Figures 1, 2:
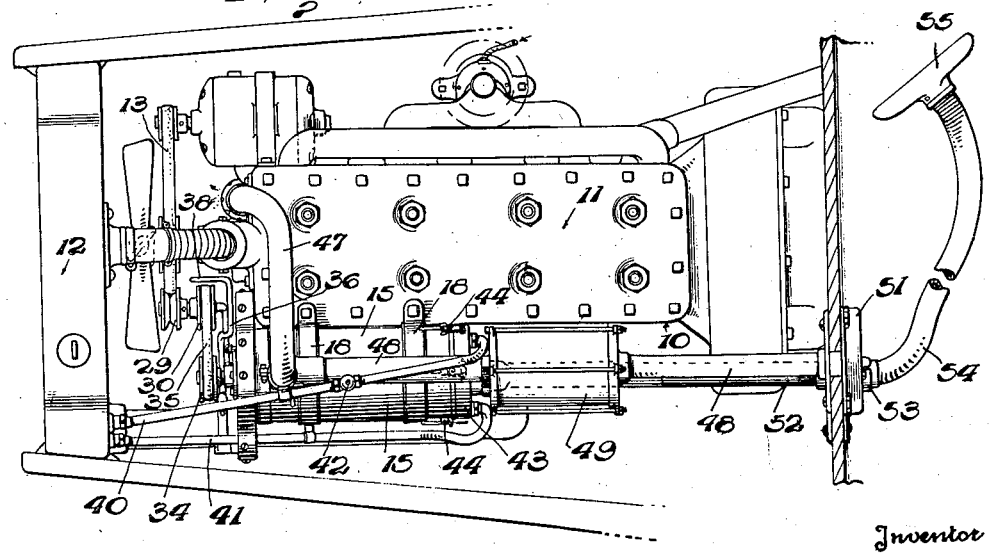
Figure 1 is a perspective view showing my improved device installed upon a conventional motor vehicle.
Figure 2 is a top plan view more particularly showing the location of the parts.

Referring now more particularly to the drawings, I have shown my improved device in conjunction with a conventional motor vehicle embodying an engine block 10, head 11, radiator 12, fan belt 13 and instrument board 14.

In carrying the invention into effect, I employ a preferably cylindrical casing 15 at the front end of which is a gear case 16. These parts may be a unit or separate and, preferably, the front plate 17 of the gear case is removable to permit ready access to the gear case. Embracing the casing 15 are straps 18, the ends of which are engaged under adjacent cap bolts of the engine head 11 for mounting the device. Any other suitable means may be employed in lieu of said straps, if so desired.

Journaled through the lower end portion of the gear case 16 is a shaft 19 on which is fixed a spur gear 20. Above the shaft 19 is a shaft 21 carrying a small gear 22 engaged by the gear 20, and a larger gear 23. Above the shaft 21 is a shaft 24 carrying a gear 25 engaged by the gear 23, and fixed to the rear end of said shaft is an approved suction fan 26 freely rotatable in the forward end of the casing 15. The gear ratio is not important.

Mounted at the front of the gear case 16, as particularly seen in Figures 3 and 6 of the drawings, is a power take-off embodying a pivoted arm 27 provided at its free end with a laterally directed terminal 28, and journaled on said terminal is a compound pulley comprising a pulley 29 beside which is a like pulley 30, the two pulleys being rigidly connected to turn in unison. At the inner end of the terminal 28, the arm 27 is provided with an offset 31 below which the arm is further provided with a second offset 32 and connected to said arm is a spring 33 normally holding the arm retracted, the two offsets forming spaced shoulders in the length of the arm. Fixed to the forward end of the shaft 19 is a pulley 34 and trained about said pulley and the pulley 30 is a belt 35 which may be of any approved character but is preferably elastic and capable of being stretched by the forward throw of the arm 27, it being observed, in this connection, that the pulley 29 is disposed in the plane of the fan belt 13 for engagement therewith.

Mounted to coact with the arm 27 is a pivoted latch 36 which is preferably formed of telescopic inner and outer sections adjustable for varying the length of the latch. The outer section of this latch is provided with a lateral offset or shoulder 37 to coact with the offsets 31 and 32 of the arm 27, and formed on said section at its free end is a handle 38.

Normally, the offset 37 of the latch 36 rides against the upper portion of the arm 27 in engagement with the offset 31, in which inactive position of the power take-off the parts are tightly held by the spring 33 against rattling. However, as will be seen, the handle 38 may be grasped and the latch swung forwardly, when the offset 37 will ride down the arm to a position engaged beneath the offset 32 of said arm, as shown. The arm 27 will thus be swung forwardly to active position supporting the pulley 29 to coact with the fan belt 13, in which position the arm will be locked by the latch and, of course, as the belt 35 is elastic, the forward throw of the arm may be varied within limits by varying the length of the latch so that wear may be taken up.

As will now be seen, when the pulley 29 is disposed in engagement with the fan belt 13, said pulley will, when the vehicle engine is in operation, be driven for driving the pulley 30, belt 35 and pulley 34. Consequently, the shaft 19 will be driven for driving the gears 20, 22, 23 and 25 and driving the fan 26. The speed of rotation of the fan, say in relation to the travel of the belt 13 will, of course, be very high. This fan speed has been deemed desirable to provide the necessary suction when the device is used as a vacuum cleaner. However, the speed of the fan for any given engine speed will, of course, be determined by the ratio of the gears 20, 22, 23 and 25 and any ratio found most practicable may be selected. Obviously, when the car is at rest, at which time the device will most likely be used as a vacuum cleaner, the speed of the fan may be accelerated by accelerating the engine of the car.

Disposed within the casing 15 is a heating coil 39 disclosed in the present instance as a compound winding one within the other. Detachably secured, appropriately, to one end of the coil is a pipe 40 which suitably connects with the upper portion of the radiator 12. Similarly secured to the other end of the coil is a pipe 41 which appropriately connects with the lower portion of the radiator. Thus, as will be understood, the coil will be heated and interposed in the pipe 40 is a suitable valve 42 for shutting off the flow of hot water through the coil when so desired. The casing 15 is closed at its rear end by a cap 43 removably secured by lever and link fastenings of no special concern.

Fixed to the top of the casing 15 above the fan 26 is an elbow having a vertical outlet 45 and a lateral outlet 46. Connected to the outlet 45 is a pipe 47, the free end of which, as seen in Figure 1, is presented to the ground. Connected to the outlet 46 is a pipe 48 in which is interposed a suitable muffler 49 of approved construction. It is the intent that the muffler shall be capable of filtering air passing therethrough and dampening noise. At its rear end, the pipe 48 enters through the instrument board 14 of the car and may terminate in any suitable fanciful fitting 50. However, this fitting is preferably provided with a door 51 adjustable to deflect currents of air issuing from the fitting.

Connected to the cap 43 of the casing 15 is a pipe 52 which enters through the instrument board 14 of the car at any suitable point and terminates in a flexible hose connection or fitting 53 to which a flexible vacuum cleaner attachment of any desired construction may be readily attached or detached. I have indicated a bayonet slot construction which, of course, may be varied and have shown a flexible cleaner hose at 54 and fitting at 55.

Mounted in the elbow formed by the outlets 45 and 46 is a pivoted valve 56, manually adjustable by a lever 57, seen in Figure 3. This valve is movable to one position to close the outlet 45 and permit free flow of air through the outlet 46 and to another position to close the outlet 46 and permit free flow of air through the outlet 45. Of course, the valve may be set in any intermediate position desired.

As will now be seen, the fan 26 may be manually rendered operative, when so desired, for drawing air through the pipe 52 from the interior of the motor vehicle and, as before pointed out, the speed of the fan may be regulated by regulating the speed of the engine of the car. By throwing the valve 56 to the dotted line position shown in Figure 4, the air will be discharged through the pipe 47 to the ground. Thus, by attaching the hose 54 to the fitting 53, a vacuum cleaner for the car will be provided. Should it be desired not to use the hose 54 and fitting 55, say when driving in summer, air may be drawn from the interior of the car and discharged to help create currents of air within the car and thus contribute to comfort.

In winter, the valve 42 is opened so that the coil 39 will be heated and the valve 56 is swung to the full line position shown in Figure 4. Thus, when desired, currents of warm air may be induced by the fan 26 to flow over said coil and expelled into the car for heating the car.

Having thus described my invention, what I claim is:

1. A device of the character described for motor vehicles including a cylindrical casing, a removable cap closing the casing at its rear end, a heating coil mounted within the casing and removable with the cap, a suction pipe extending axially from the cap into the vehicle body, an outlet pipe leading at its inner end from the forward end of the casing and open at its outer end to the atmosphere, a connection carried by the rear end of said suction pipe within the vehicle body and readily accessible from the interior thereof for the attachment of a flexible cleaner hose for cleaning the interior of the vehicle body by suction, a suction fan mounted in the casing near the forward end thereof opposite said suction pipe for drawing currents of air forwardly through said suction pipe and casing from the interior of the vehicle body and expelling said currents through said outlet pipe, a return pipe having junction with the outlet pipe near the inner end of the latter and leading into the vehicle body, and a valve mounted at said junction for selectively diverting said expelled air currents through the outlet pipe to the atmosphere or through the return pipe to the interior of the vehicle body.

2. A device of the character described for motor vehicles, comprising, in combination, a housing having a portion displaceable for permitting access to the interior thereof, a suction pipe extending from the housing into the vehicle body, an outlet pipe leading from the housing to the atmosphere, air circulating means in the housing for drawing currents of air through said suction pipe and expelling the same through the outlet pipe, a return pipe leading from said housing to the vehicle body, and selector means for diverting said air currents through the outlet pipe to the atmosphere or through the return pipe to the interior of the vehicle body.

3. A device of the character described for motor vehicles, comprising, in combination, a housing having a portion displaceable for permitting access to the interior thereof, a suction pipe extending from the housing into the vehicle body, an outlet pipe leading from the housing to the atmosphere, a connection carried by the suction pipe remote from said housing for attachment of a cleaner hose for cleaning the vehicle body by suction, air circulating means in the housing for drawing currents of air through said suction pipe and expelling the same through the outlet pipe, a return pipe leading from said housing to the vehicle body, selectors means for diverting said air currents through the outlet pipe to the atmosphere or through the return pipe to the interior of the vehicle body, and a muffler in said return pipe operable to filter air discharged into the vehicle body.

4. A device of the character described for motor vehicles, comprising, in combination, a housing having a portion displaceable for permitting access to the interior thereof, heat exchange means mounted in the casing and removable therefrom, a suction pipe extending from the housing into the vehicle body, an outlet pipe leading from the housing to the atmosphere, air circulating means in the housing for drawing currents of air through said suction pipe and expelling the same through the outlet pipe, a return pipe leading from said housing to the vehicle body and selector means for diverting said air currents through the outlet pipe to the atmosphere or through the return pipe to the interior of the vehicle body.

VINCENT TAVERNESE.